March 24, 1925.  
W. H. KOPITKE  
BEET HARVESTING MACHINE  
Filed Jan. 18, 1922

March 24, 1925. 1,531,195
W. H. KOPITKE
BEET HARVESTING MACHINE
Filed Jan. 18, 1922 6 Sheets-Sheet 3

March 24, 1925. 1,531,195
W. H. KOPITKE
BEET HARVESTING MACHINE
Filed Jan. 18, 1922 6 Sheets-Sheet 6

Inventor
W. H. Kopitke,
By Watson, Cait, Morse & Grindle,
Attorney

Patented Mar. 24, 1925.

1,531,195

UNITED STATES PATENT OFFICE.

WILLIAM H. KOPITKE, OF WILDWOOD, OHIO, ASSIGNOR, BY MESNE ASSIGNMENTS, TO THE FANGER BEET HARVESTER COMPANY, A CORPORATION OF OHIO.

BEET-HARVESTING MACHINE.

Application filed January 18, 1922. Serial No. 530,125.

*To all whom it may concern:*

Be it known that I, WILLIAM H. KOPITKE, a citizen of the United States, residing at Wildwood, Lucas County, State of Ohio, have invented certain new and useful Improvements in Beet-Harvesting Machines, of which the following is a specification.

The present invention relates to beet harvesting machines of the type having means for topping the beets while they still remain in the ground, that is, removing the leaves or foliage of the plant and the upper portion of the body of the beet, and also having means for removing the beets from the ground after the topping operation, and finally depositing them in a bin carried by the harvester.

In my copending application, Serial No. 425,321, filed November 20, 1920, a harvester of this class is disclosed. The wheeled frame of the machine has supported thereon for vertical movement a tread device which is spring pressed downwardly to engage successive beets as the harvester passes along a row, and has cutting blades associated therewith which cut off the leaves of the beet and a certain portion of the top of the beet body, the connections between the cutting element and the tread device being such that the vertical movement of the cutting element is proportional to the vertical movement of the tread device. The apparatus is so designed that the portion of the top of the beet which is removed by the cutter increases with the size of the beet, the tread device constituting a gauge for the cutting element which, rising and falling simultaneously with this gauge and a distance proportional to the movements of the gauge, cuts a large slice from the top of a relatively large beet and a small slice from a relatively small beet, the aim being to remove only that portion of the top of the beet which is without value in the manufacture of sugar. The tread device holds the beet firmly while the cutting is being done so that a clean cut is insured. Two parallel augers rotating in opposite directions which follow the cutter pull the beet from the ground and carry it to an endless chain provided with beet carrying plates which lift the beets one after the other and deposit them in a bin or receptacle.

The present invention is in general principle similar to the one above briefly described, having a tread device which acts as a gauge for the cutter and which presses downwardly on the top of a beet which is being cut, and augers for lifting the beet to a traveling belt. Numerous improvements have been made however in the details of construction. The tread device is simpler and stronger, the cutting element is modified and improved, the connections between the cutting element and the tread device are simpler and secure a more efficient cooperation of these elements of the machine.

The present invention may be embodied in numerous forms and one form is described below and illustrated in the accompanying drawings in which:

Figure 1 is a side view of the harvester in position to harvest a row of beets;

Figure 1ª illustrates diagrammatically certain members of the adjustable frame from which the tread device, cutting element, and augers are suspended;

The harvester, which is adapted to be driven by an internal combustion engine, has many well known features of construction which need not be specifically described in this application. The main frame is indicated at 10, this frame being supported upon wheels in the usual manner and carrying the driving engine, the beet receiving bin or receptacle, the beet lifting belt or chain, and supporting for vertical adjustment relative thereto the auxiliary frame 11 to which in turn are secured the tread device, the cutter, and the augers, so that these three elements are vertically adjustable relatively to the main frame.

Figures 1, 1A:
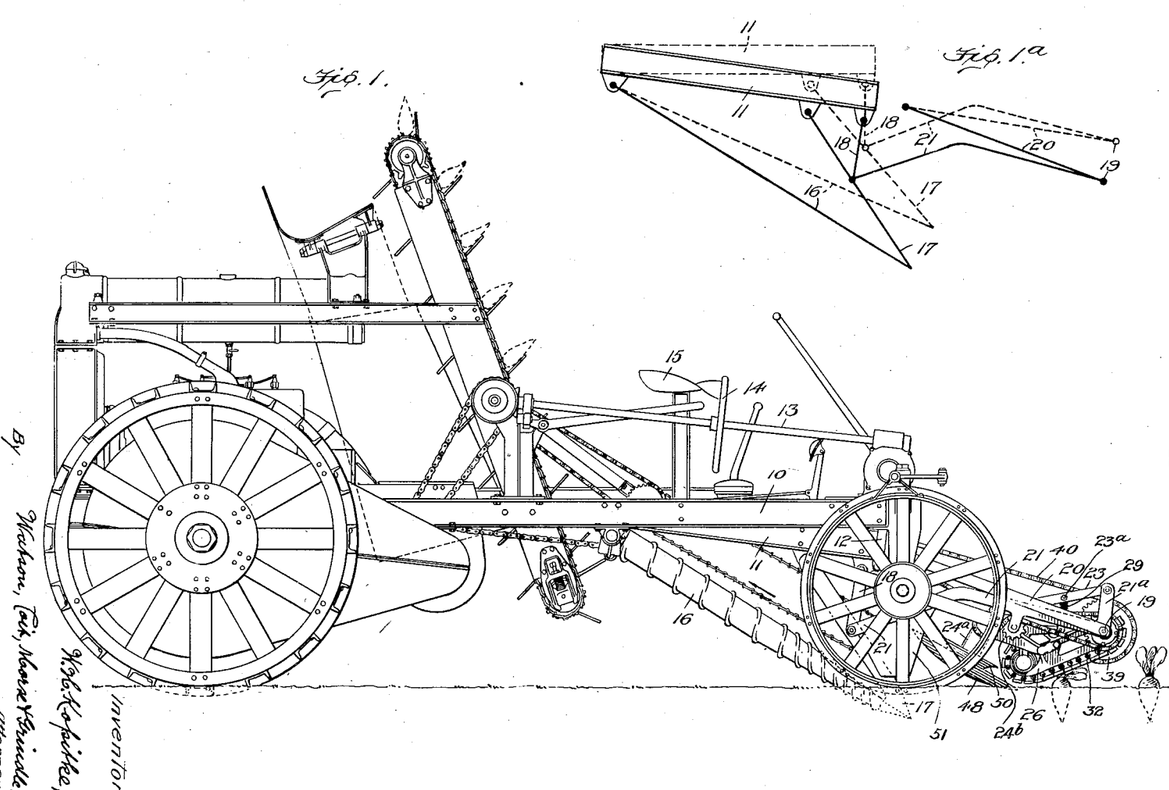

The frame 11 is pivoted to the frame 10 to rotate about an axis transverse to the machine and at the rear end of the auxiliary frame. Links 12 extend upwardly from opposite sides of the forward end of the auxiliary frame and are operatively connected by suitable gearing to a shaft 13 having a hand wheel 14 fixed thereon adjacent the driver's seat 15, the arrangement being such that the frame 11 may be raised and lowered when the hand wheel 14 is rotated by the driver. Parallel earth augers 16, one only of which can be seen, extend downwardly from the auxiliary frame and the lower ends of these augers enter sockets in the lower ends of brace arms 17, the upper ends of these arms being secured to the auxiliary frame 11.

The mechanism so far described is disclosed in greater detail in my copending application before mentioned.

Links 18 connect the outer end of the auxiliary frame with the middle points of brace arms 17. A transverse carrying shaft is indicated at 19 and this shaft is supported horizontally in advance of the front of the frame of the machine by suspending links 20, one of which is located at each end of the shaft and connects that end to the main frame, and by brace links 21 and 22 which extend rearwardly from shaft 19 and have their rear ends secured to brace arms 17. The brace link 22 is straight, whereas brace link 21 is upwardly curved for a purpose hereinafter to be fully explained.

In Figure 1$^a$ the auxiliary frame is illustrated in side elevation and the other members, just described, diagrammatically. It will be seen that when the frame 11 is raised or lowered the carrying shaft 19 will be likewise raised or lowered and in this manner the tread device and cutting element may be lifted from proximity to the ground for the purpose of transporting the machine, or may be dropped when harvesting is to be undertaken. The augers 16 are of course simultaneously raised and lowered.

Figure 2:
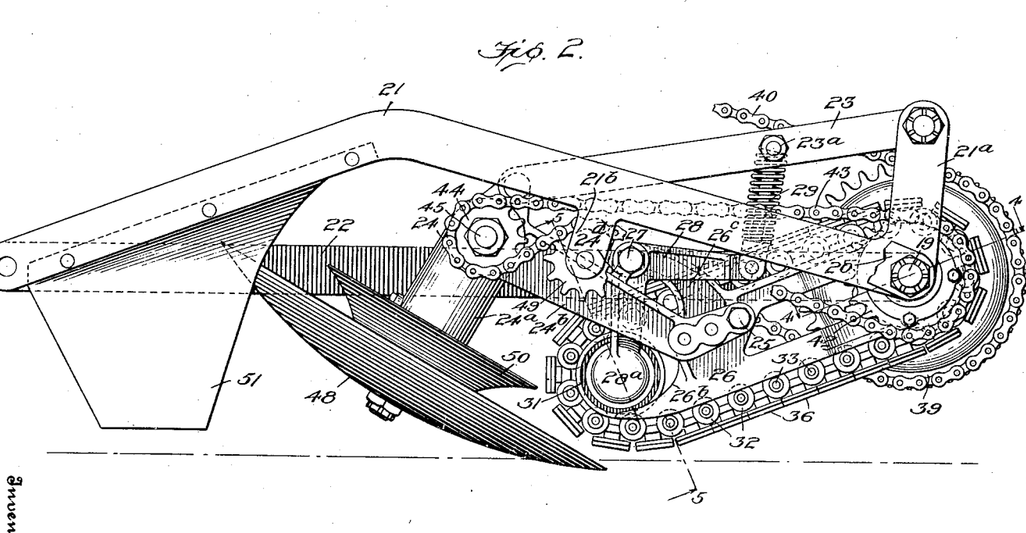
Figure 2 is an enlarged side view of the tread device and cutting element.
Figure 3:
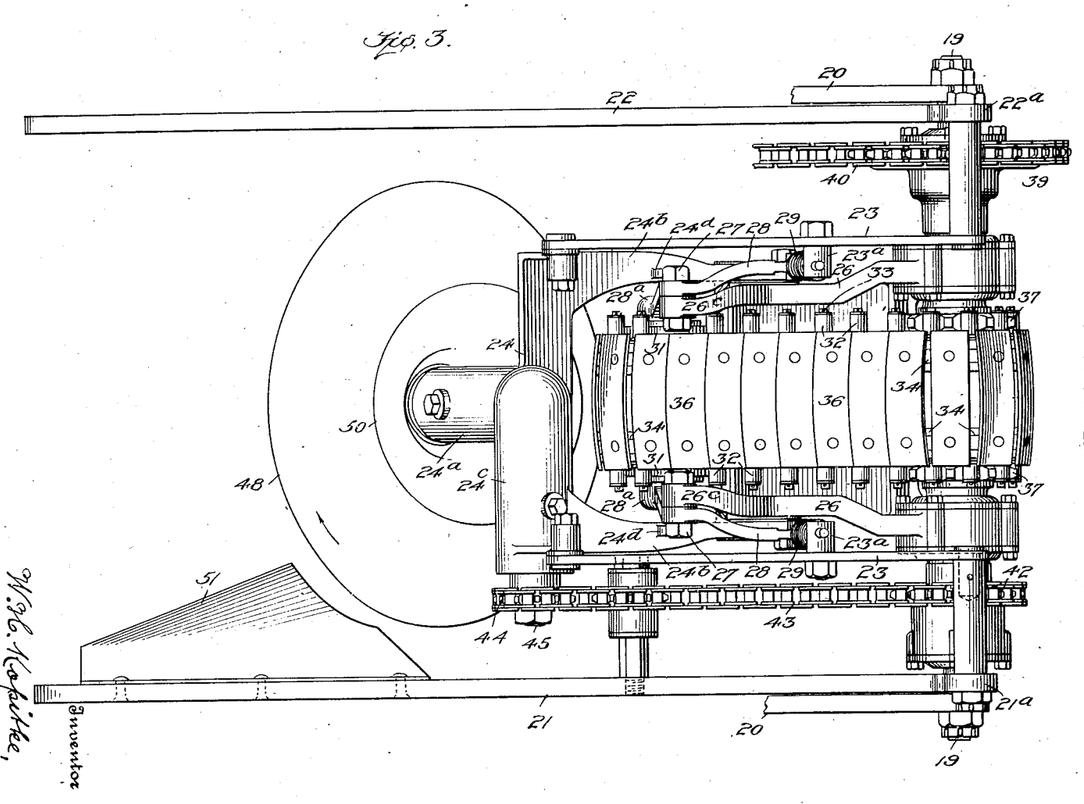
Figure 3 is a top plan view of the same.

Referring particularly to Figures 2 and 3, it will be seen that the brace links 21 and 22 have upwardly extending portions 21$^a$ and 22$^a$ at their forward ends and that the upper ends of these extensions have links 23 pivotally secured thereto, which links extend rearwardly and are pivotally connected at their rear ends to the upper portion of the cutting blade carrying member 24. This last mentioned member is substantially L-shaped as viewed from the side, having an inclined tubular portion 24$^a$, which constitutes a housing for a rotatable shaft, and two forwardly and downwardly extending arms 24$^b$, the forward ends of which are pivotally secured by bolts 25 to the sides of the frame 26 of the tread mechanism. Several bolt holes are provided in the arms 24$^b$ for the purpose of adjusting the member 24 in relation to frame 26.

Figure 11:
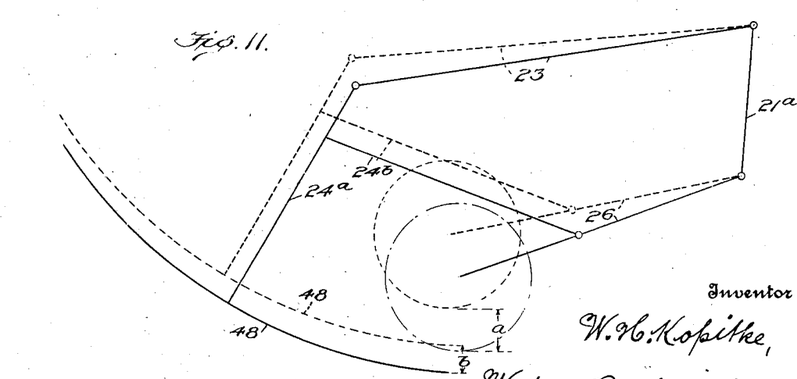
Figure 11 is a diagram to show the relative movement of the cutting element for a certain movement of the tread device.

Frame 26 has its forward end supported on carrying shaft 19 and is rotatable about said shaft as an axis. The members 23, 24, 26 and 21$^a$ just described are diagrammatically illustrated in Figure 11 and it will be seen that these members constitute a form of linkage, members 23 and 26 rotating about fixed horizontal axes at their forward ends and being approximately parallel, and member 24 in its rising and falling movements maintaining substantially a constant inclination.

Figure 9:
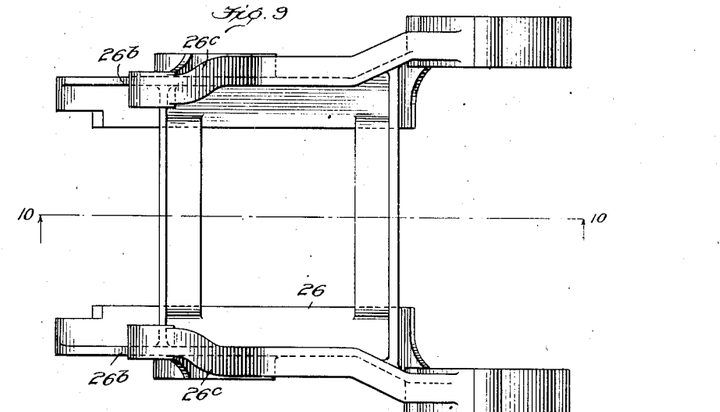
Figure 9 is a top plan view of the frame of the tread mechanism.
Figure 10:
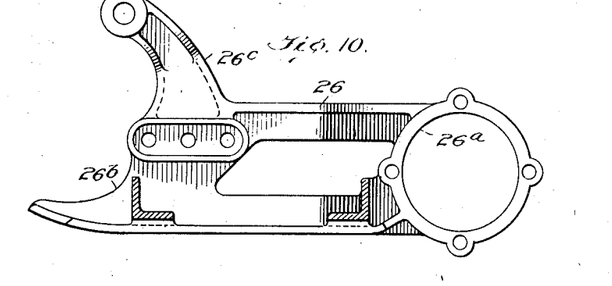
Figure 10 is a section on line 10—10 of Figure 9.

The frame of the tread device is preferably a symmetrically formed casting, illustrated in Figures 9 and 10, the forward ends of this member having aligned circular apertures 26$^a$ through which the shaft 19 extends, the rear ends of the sides of the frame being cut away at 26$^b$. Extending upwardly from each side of the frame is a pedestal 26$^c$ and each of these pedestals has pivotally secured to its upper end by means of a bolt 27, an angular member 28 having one substantially horizontal forwardly extending arm and one substantially vertical downwardly extending arm. The forward ends of these arms are pressed downwardly by coiled compression springs 29, the upper ends of which abut against pins 23$^a$ extending laterally from links 23, the effect of this spring action being to force the lower ends of members 28 rearwardly. The lower ends of these members have enlarged portions 28$^a$ which are substantially cylindrical and are adapted to be received, when the angular members 28 rock forwardly, into the recesses 26$^b$ of the frame. These enlargements 28$^a$ are connected by a shaft 30 and fixed on this shaft are spaced vertically disposed circular guides 31 over the peripheries of which the rollers 32 of the tread belt are adapted to pass.

This tread belt comprises a plurality of parallel shafts 33 linked together in spaced relation and having rotatably mounted on their outer ends the rollers 32, beforementioned. Intermediate the ends of shaft 33, and secured to the links 34, are outwardly projecting studs 35 to which are secured the curved transverse tread plates 36. The tread belt is endless and passes around guides 31 at the rearward limit of its travel and around sprockets 37 at the forward limit of its travel, the interdental spaces of the sprockets receiving the rollers 32. The sprockets 37 are keyed or splined on a sleeve 38 surrounding the shaft 19 and this sleeve is driven by a sprocket 39 which is connected by a chain 40 with a second sprocket supported on the main frame of the machine and driven by the engine.

The speed of rotation of the sprockets 37 is such that the treads of the belt move substantially at the ground speed of the machine. Springs 29, exerting a constant downward pressure on members 38, tend to force the lower ends of these members rearwardly at all times, as previously pointed out, and serve therefore as means for maintaining the tread belt taut and also as means for pressing the tread frame downwardly and into contact with the beet tops.

It is necessary to limit the downward movement of the tread belt to prevent it from engaging at its rear end, the cutting disk 48. For this purpose the arms 24$^b$ of member 24 are provided with lugs 24$^d$ which serve as abutments against which the bolt heads 27 strike, as shown in Figure 2, and the downward movement of the tread frame stopped. Roller bearings 41 are interposed between the rotating sleeve 38 and the apertures 26$^a$ of the tread frame so that the rotation of this sleeve will not tend to rotate the tread frame about the carrying shaft 19.

Also keyed to the rotatable sleeve 38 is a sprocket 42 which is connected by means of a chain 43 to a sprocket 44 secured on the end of a horizontal shaft 45 rotatably supported within a cylindrical housing 24$^c$. This shaft is in turn operatively connected by bevel gears 46 to a shaft 47 journaled within the housing 24$^a$, the housings 24$^a$ and 24$^c$ comprising integral portions of member 24. Rotation of sleeve 38 therefore effects rotation of shaft 47 and the rotation of the dish-shaped cutting disk 48 which is secured to the lower end of this shaft. The lower reach of chain 43 passes over an idle sprocket 49 rotatably secured to a downwardly projecting portion 21$^b$ of brace link 21 and this sprocket 49 tends to prevent the chain from becoming disengaged from the sprocket 44.

Figure 4:
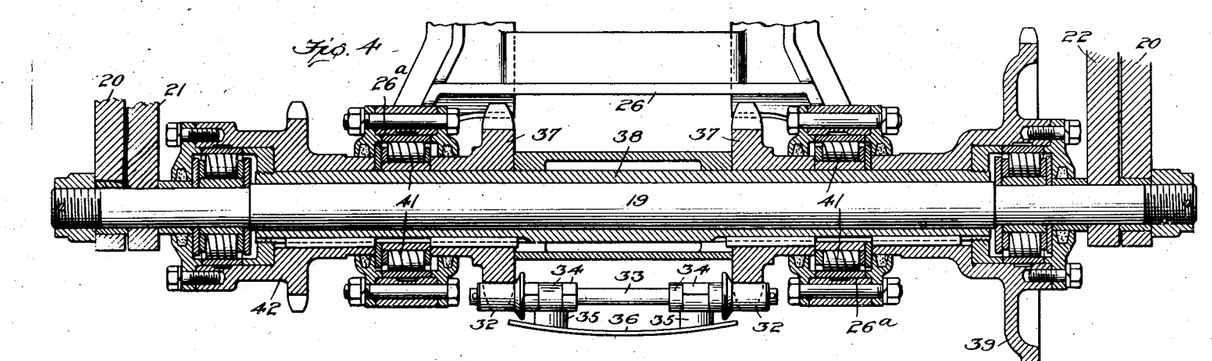
Figure 4 is a section on line 4—4 of Figure 2.
Figure 5:
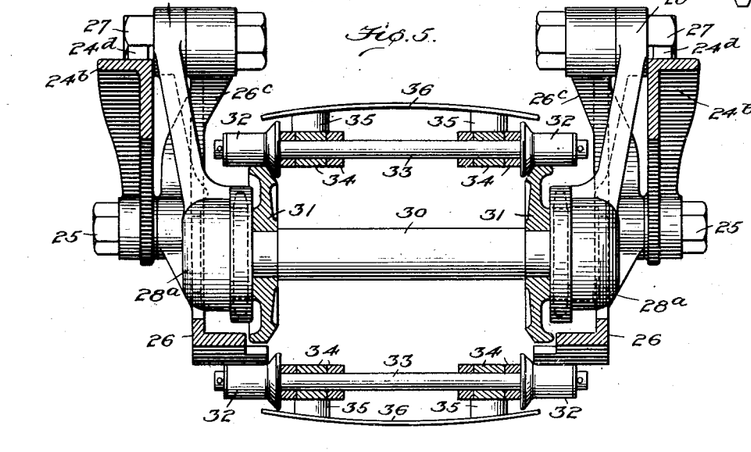
Figure 5 is a section on line 5—5 of Figure 2.
Figure 6:
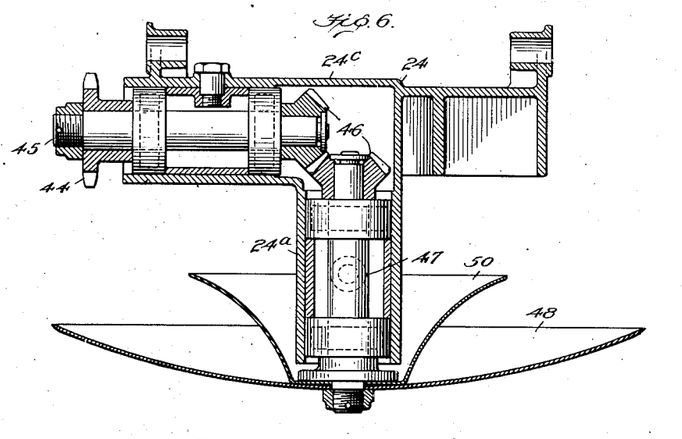
Figure 6 is a section through the cutting element and its supporting member.
Figures 7, 8:
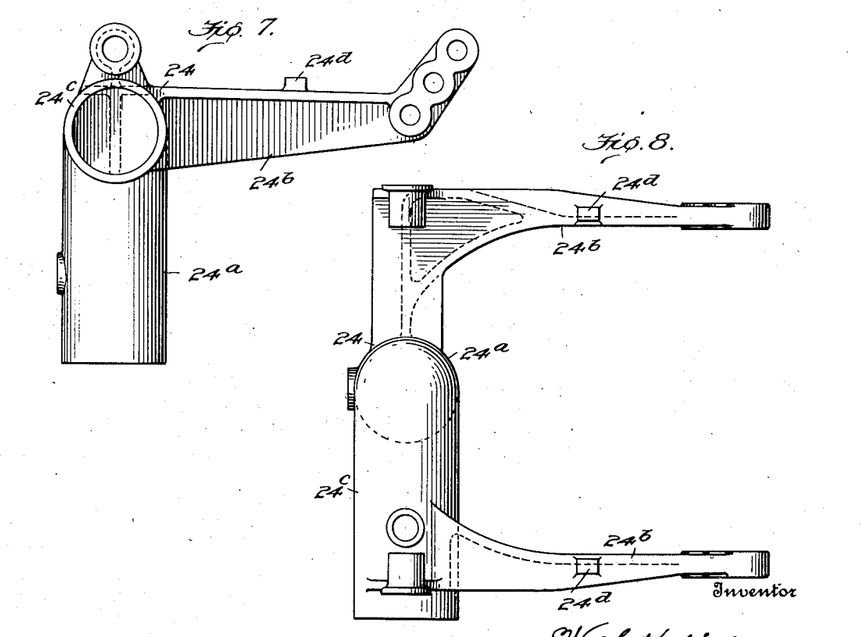
Figure 7 is a side elevation of the cutting element supporting member.
Figure 8 is a top plan view of the same.

The chain 40, being driven by the engine of the harvester, which also drives the traction wheels, moves at a speed proportional to the ground speed of the machine and, as previously pointed out, the connections between the tread belt and this chain are such that the tread belt is actually driven at ground speed so that there is no backward or forward pushing or pulling force exerted on the beet tops which the tread belt engages. The cutting disk 48, also driven from the belt 40, rotates at a relatively high speed, and quickly severs the top of the beet at an elevation which is determined by the tread acting as a gauge. The treads 36 of the tread belt are curved transversely of the belt as shown in Figures 4 and 5, the curvature being such that the tread engaging a beet top is substantially parallel to the forward cutting edge of the cutting disk 48 during the cutting operation. An upwardly flaring hollow circular member 50 is also secured to the lower end of shaft 47 and this member engages the beet tops which have been severed by the disk 48 and throws them laterally, clearing the disk and throwing them out of the way of the beet lifting augers which follow the disk. The brace link 21 is curved upwardly for the purpose of allowing the beet tops free passage laterally from the cutting disk and the blade 51 secured to the brace link 21 serves to throw these beet tops to the side, and to keep the disk and member 50 clear of leaves, etc.

When moving the machine from place to place the auxiliary frame 11 is in its lifted position and the earth augers, tread mechanism and cutting elements are inoperative. When the machine is placed in position for topping and lifting beets the auxiliary frame is lowered, as shown in Figure 1, the carrying shaft 19 being at such elevation that the trailing belt slopes downwardly and rearwardly to engage the beet tops, the tallest beet being able to pass under the forward end of the belt and the shortest beet being engaged at least by the lowermost point of the belt immediately in front of the cutting disk. The springs 29 maintain the belt taut and also, as before pointed out, exert a downward pressure on the beet tops, this pressure being greater for larger beets than for small ones due to the increasing resistance of the spring as the tread frame moves upwardly (at a faster rate than the links 23). Rising and falling of the tread frame causes simultaneous and proportional rising and falling movements of the cutting disk as previously pointed out and a portion of the beet is removed which is substantially proportional to its height above ground. By removing bolts 25 and placing them in different apertures in arms 24$^b$, the inclination of the cutting blade may be altered at will.

The cutting edge or forward edge of disk 48 is at all times substantially horizontal although its inclination varies slightly as the member 24 tilts in its rising and falling movements. As can be seen from Figure 1 the tread belt and cutting disk have relative movement toward each other as they rise and have relative movement away from each other as they fall, but even in the lowermost position of the tread belt and cutting disk the belt rests upon and holds in place the beet being cut.

The mechanism above described, is of simple and strong construction and is thoroughly satisfactory in operation. The number of parts has been reduced to a minimum and these parts are of such construction as to present a maximum strength for a given weight of metal. However, the principle of the invention may be embodied in different forms from that shown and described and it is not limited in its scope to any specific form.

Claims:

1. A machine of the class described comprising in combination, a supporting frame, a tread device supported on said frame for a limited vertical movement relatively thereto, a cutting blade supporting member, and means for supporting said member for vertical movement relatively to the frame and differential vertical movement relative to the tread device, including a link pivotally secured to both said member and said frame.

2. A machine of the class described comprising in combination, a supporting frame, a tread device supported on said frame for a limited vertical movement relatively thereto, a cutting blade supporting member, and means for supporting said member for vertical movement relatively to the frame and differential vertical movement relative to the tread device, including a link extending forwardly from said member and pivotally connected to the frame.

3. A machine of the class described comprising in combination, a supporting frame, a tread device supported on said frame for a limited vertical movement relatively thereto, a cutting blade supporting member, and means for supporting said member for vertical movement, relatively to the frame and differential vertical movement relative to the tread device, including parallel links extending forwardly and upwardly from said member, said links being pivoted to the frame and member.

4. A machine of the class described, including in combination, a supporting frame, a tread device pivotally supported on said frame, a cutting blade supporting member pivotally connected to said tread device, and a link pivoted to said member and frame for supporting the member from the frame.

5. A machine of the class described, including in combination, a supporting frame, a tread device pivotally connected to said frame, a cutting blade supporting member having a direct pivotal connection with the tread device, and a link pivoted to said member and frame for supporting the member from the frame.

6. A machine of the class described, including in combination, a supporting frame, a tread device pivotally connected to said frame, a cutting blade supporting member pivotally connected to the tread device, and means connecting said member to the frame in such manner as to cause it to rotate about an axis transverse to the frame and in advance of said member.

7. A machine of the class described including in combination a supporting frame, a tread device supported by said frame for limited vertical movement relatively thereto, and a cutting blade supporting member pivotally connected to both the frame and tread device.

8. A machine of the class described, including in combination, a supporting frame, a transverse shaft carried in said frame, a tread frame pivotally hung from said carrying shaft, and a cutting blade carrying member pivotally connected to said tread frame and to said supporting frame.

9. A machine of the class described, including in combination, a supporting frame, a transverse shaft carried in said frame, a tread frame extending rearwardly from the carrying shaft and pivotally supported thereon, a cutting blade carrying member directly pivoted to the tread frame, and a link connecting said member and the supporting frame.

10. A machine of the class described comprising in combination, a supporting frame, a tread device supported on said frame for a limited vertical movement relative thereto, a cutting blade supporting member having a downwardly and rearwardly inclined portion and a forwardly extending arm, said arm being directly pivoted to the tread device, and a link connecting said member and the supporting frame.

11. A machine of the class described comprising in combination, a supporting frame, a tread device and a cutting blade supporting member connected to the supporting frame and tread device for differential vertical movement relatively to the tread device, said member having a portion constituting a housing for a rotatable shaft.

12. A machine of the class described comprising in combination, a supporting frame, a tread device and a cutting blade supporting member connected to the supporting frame and tread device for differential vertical movement relatively to the tread device, said member having a horizontal portion and a portion disposed in a vertical plane, which portions constitute housings for rotatable shafts geared together.

13. A machine of the class described comprising in combination, a supporting frame, a tread device, a cutting blade, a cutting blade supporting member having a portion constituting a housing for a rotatable shaft, a shaft in the housing and connected to the blade for rotating the same.

14. A machine of the class described, including in combination, a supporting frame, a traveling belt tread device, a blade supporting member, a rotatable cutting blade, and continuous means rotatable with the blade for clearing the same of severed beet tops.

15. A machine of the class described, including in combination, a supporting frame, a tread device, a blade supporting member, a rotatable cutting blade, and a circular member above and concentric with the blade and movable therewith, for clearing the same of severed beet tops.

16. A machine of the class described, including in combination, a supporting frame, a tread device, a blade supporting member, a rotatable cutting blade, and an upwardly flaring circular member, concentric with the blade and mounted above the same for rotation therewith, for clearing the blade of severed beet tops.

17. A machine of the class described, including in combination, a supporting frame, a tread device supported from the frame and having a tread belt, and means for exerting a downward pressure on the tread device which at the same time tends to maintain the tread belt taut.

18. A machine of the class described, including in combination, a supporting frame, a tread device supported from the frame and having a tread belt, and means including a lever and spring for exerting a downward pressure on the tread device and at the same time a force tending to maintain the tread belt taut.

19. A machine of the class described, including in combination, a supporting frame, a tread device supported from the frame and having a tread belt, and means including a lever pivoted to the tread device and a spring acting on said lever for exerting a downward pressure on the tread device and at the same time a force tending to maintain the tread belt taut.

20. A machine of the class described, including in combination, a supporting frame, a tread device supported from the frame and having a tread belt, and means including a lever pivoted to the tread device and a spring bearing against the lever and against a member supported on the frame, for exerting a downward pressure on the tread device and at the same time a force tending to maintain the tread belt taut.

21. A machine of the class described, including in combination, a supporting frame, a tread device supported from the frame and having a tread belt, and means including a spring having one end connected to the supporting frame, for exerting a downward pressure on the tread device and at the same time a force tending to maintain the tread belt taut.

22. A machine of the class described, including in combination, a supporting frame, a tread device supported from the frame and having a tread belt, and means including a lever pivoted to the tread device, one end of which bears against the tread belt, and a spring acting on the other end of the lever for exerting a force tending to keep the tread belt taut.

23. A machine of the class described, including in combination, a supporting frame, a tread device supported from the frame and having a tread belt, and means including a lever pivoted to the tread device, one end of which bears against the tread belt, and a spring acting on the other end of the lever for exerting a force tending to keep the tread belt taut and at the same time to exert a downward pressure on the tread device the spring being also connected to the frame.

24. A machine of the class described, including in combination, a supporting frame, a tread device supported from the frame and having a tread belt, and means including a bell crank lever pivoted on the tread device and having one end in contact with the tread belt, and a spring connected to the frame and acting downwardly on the other end of the bell crank lever, for maintaining the belt taut and exerting a downward force on the tread device.

25. A machine of the class described including in combination, a supporting frame, a tread device supported by said frame for limited vertical movement relatively thereto, and a cutting blade supporting member pivotally connected to both the frame and tread device, said tread device and member having portions adapted to mutually engage to limit the downward movement of the tread device relatively to the frame.

26. A machine of the class described including in combination, a supporting frame, a tread device supported by said frame for limited vertical movement relatively thereto, and a cutting blade supporting member pivotally connected to both the frame and tread device, said tread device having a lateral projection and said member having a stop against which said projection is adapted to abut to limit the downward movement of the tread device relatively to the frame.

27. A machine of the class described including in combination, a supporting frame, a tread device supported by said frame for limited vertical movement relatively thereto, a rotatable cutting blade, and means positioned adjacent the edge of the blade beyond the periphery thereof for clearing it of objects adhering thereto.

28. A machine of the class described including in combination, a supporting frame, a tread device supported by said frame for limited vertical movement relatively thereto, a rotatable cutting blade, and a stationary blade supported on the frame and arranged at right angles to the cutting blade, for removing adhering objects from the cutting blade.

29. A machine of the class described including in combination, a supporting frame, a tread device pivotally mounted to trail therefrom, a cutting blade connected to the tread device and having a rising and falling movement simultaneously therewith and proportional thereto, said tread device and cutting blade being relatively adjustable in a horizontal direction.

30. A machine of the class described including in combination, a supporting frame, a tread device pivotally mounted to trail therefrom, a cutting blade connected to the tread device and to the frame and having a rising and falling movement with the tread device and proportional thereto the connections between the cutting blade, frame, and tread device being such that the cutting blade and tread device have a relative horizontal movement when rising or falling.

In testimony whereof I hereunto affix my signature.

WILLIAM H. KOPITKE.